Sept. 7, 1954          D. E. SUNSTEIN          2,688,744
MEANS FOR CONTROLLING ANTENNA CHARACTERISTICS IN
OBJECT LOCATING SYSTEMS OF THE REFLECTION TYPE
Filed Nov. 12, 1948          4 Sheets-Sheet 1

INVENTOR.
DAVID E. SUNSTEIN
BY

AGENT

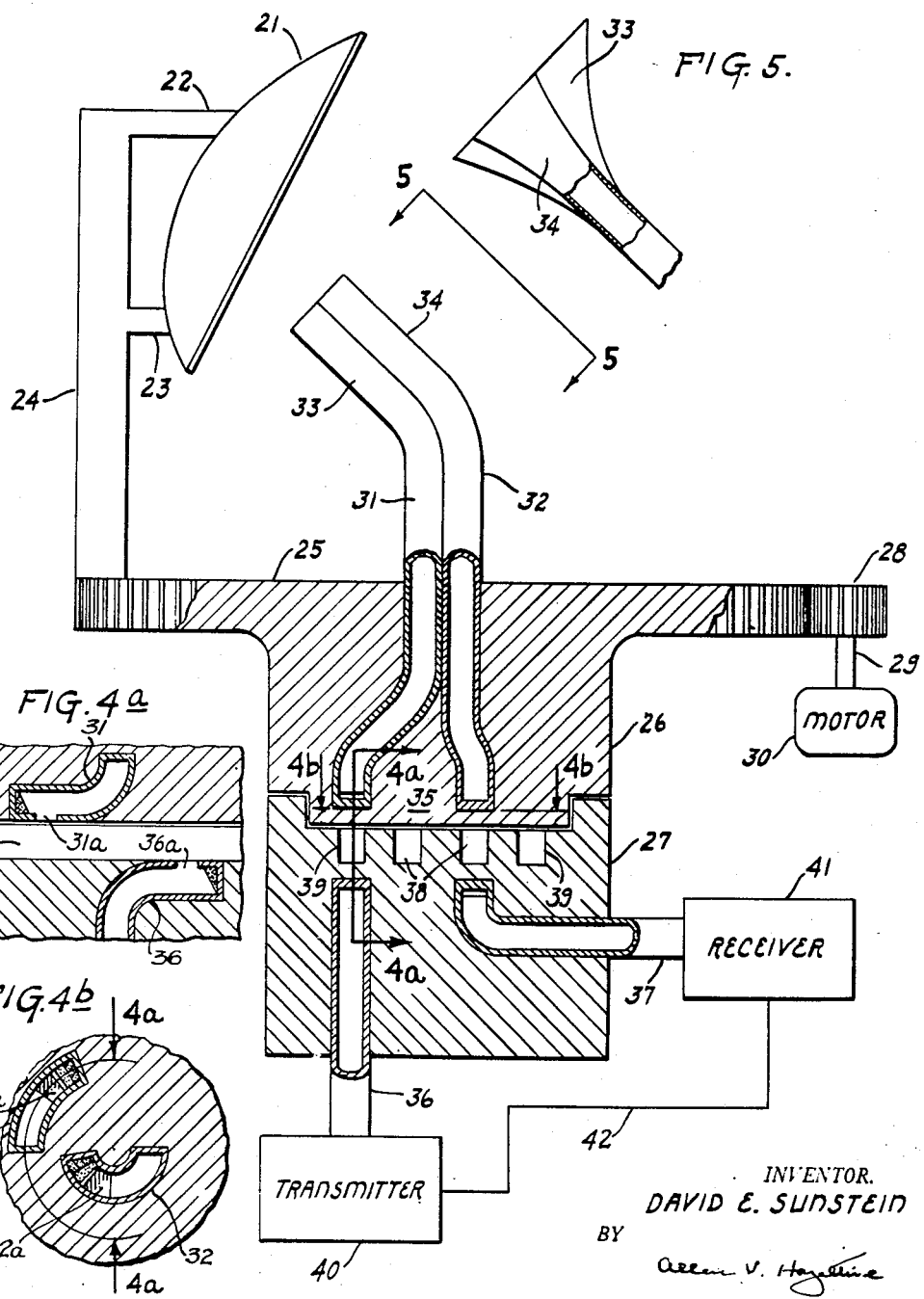

Sept. 7, 1954           D. E. SUNSTEIN           2,688,744
MEANS FOR CONTROLLING ANTENNA CHARACTERISTICS IN
OBJECT LOCATING SYSTEMS OF THE REFLECTION TYPE
Filed Nov. 12, 1948                             4 Sheets-Sheet 3

INVENTOR.
DAVID E. SUNSTEIN
BY
AGENT

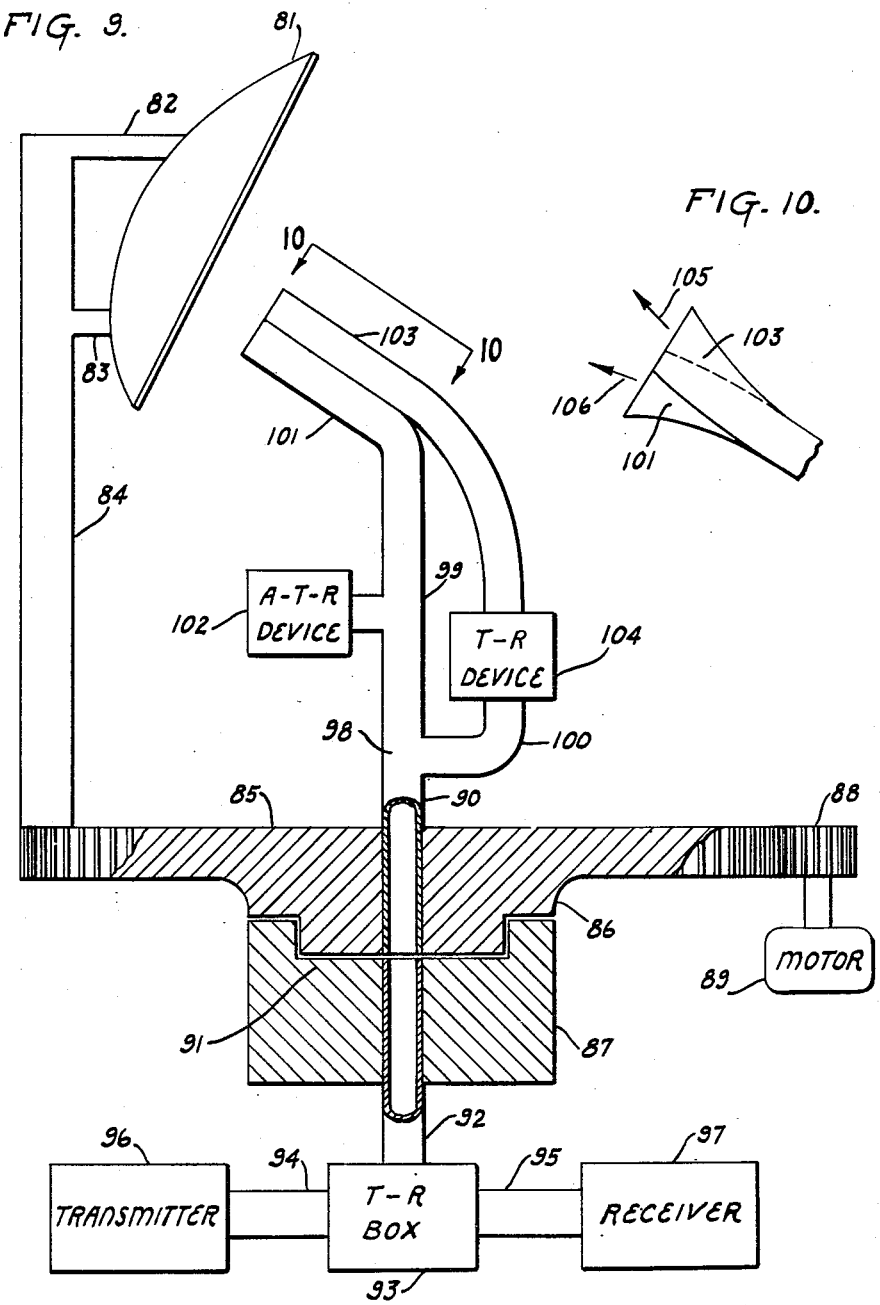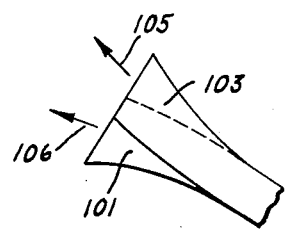

Patented Sept. 7, 1954

2,688,744

UNITED STATES PATENT OFFICE 2,688,744

MEANS FOR CONTROLLING ANTENNA CHARACTERISTICS IN OBJECT LOCATING SYSTEMS OF THE REFLECTION TYPE

David E. Sunstein, Cynwyd, Pa., assignor to Philco Corporation, Philadelphia, Pa., a corporation of Pennsylvania Application November 12, 1948, Serial No. 59,449

21 Claims. (Cl. 343—16)

The invention herein described and claimed relates to scanning antennas of the sort particularly adapted for use in radar and like systems to produce an orientable beam of electromagnetic energy which is caused to scan an area and impinge on target objects which may be disposed throughout the area, so as to produce reflections which, in turn, are received by the antenna and utilized to provide data with respect to the positions of the objects producing the reflections. More specifically the invention relates to improved antenna apparatus and methods of operating the same, whereby it is possible to achieve unusually high scanning speeds without the heretofore attendant reduction in maximum range of the system with which the antenna is employed.

In conventional search-type radar systems it is customary to provide a directonal antenna which is used for both transmission and reception and which is rotated about an axis—usually vertical— so as to transmit electromagnetic wave energy in different azimuthal directions and to receive reflections of such energy from target objects. It is apparent that, in such a system, where the energy is transmitted in the form of relatively widely spaced pulses of short duration, but a limited number of reflections will be produced from a given target upon each rotation of the antenna. Hence where, for example, the received energy is used to provide indications of the positions of the targets on the screen of a cathode ray tube, it would appear desirable to rotate the antenna at a rather high speed in order to get as many "looks" at the target as possible per unit time and thereby to provide as accurate as possible a presentation of the area scanned. However, there are certain considerations which, in the past, have imposed a limitation on the maximum speed of rotation which could be employed without adversely affecting the operation of the system in other respects. For example, increasing the angular speed of rotation of the antenna has a tendency, in conventional radar systems, to reduce the maximum range of target from which usable signals can be received. The reason for this will be apparent from a brief consideration of the characteristics and operation of a typical system. In such a system it is usually desirable to make the scanning antenna as highly directional as possible in order to provide for good resolution of targets whose angular displacements are small. If, however, the width of the antenna pattern is made very narrow to achieve this end, and if the antenna is rotated at high angular speed, then, upon the arrival of a reflection from a relatively distant target, the antenna will be pointed in a direction substantially different from that of the target producing the reflection, and will be incapable of receiving the reflected signal effectively.

The present invention is directed to the provision of methods of and apparatus for eliminating this difficulty, and has, as its objects, the following:

(1) To provide an improved orientable, directional antenna for radiating electromagnetic wave energy and for receiving reflections of said radiated energy from target objects variously disposed with reference to said antenna;

(2) To provide an improved method of operating an orientable, directional antenna to cause it to radiate electromagnetic wave energy in a plurality of different directions and to receive reflections of said radiated energy from target objects variously disposed with reference to said antenna.

(3) To provide an improved orientable, directional antenna structure for radiating electromagnetic wave energy in a plurality of different directions and for directionally receiving reflections of said transmitted energy from target objects, said structure being capable of rapid changes in orientation to alter the direction from which it is momentarily capable of receiving reflections of said energy from target objects without appreciably reducing its capability to receive reflections from distant targets; and (4) To provide an improved method of operating an orientable, directional antenna to cause it to radiate electromagnetic wave energy in a plurality of different directions and to cause rapid variation in the direction from which said antenna is momentarily capable of receiving reflections of said energy from target objects without appreciably reducing its ability to receive reflections from distant targets.

The general nature and characteristics of the apparatus and method for achieving these objectives will now be discussed briefly before proceeding with a detailed consideration of the principle, method and representative embodiments of the invention. Broadly the invention contemplates the use of an antenna structure constructed so as to be capable of directionally radiating and receiving electromagnetic wave energy, the structure being mounted for variation in its orientation as a whole, at least at a relatively slow rate, whereby to vary the direction of radiation and reception. Beyond this it also contemplates means incorporated in the antenna structure whereby the inherent characteristics of the radiation and reception patterns may be altered, in respect of either their width or their direction, or both, much more rapidly than, for example, it would be possible to vary the direction of radiation and reception by variation in the orientation of the structure as a whole. There are a number of possible ways of providing such a structure, which are fully disclosed hereinafter. However it is not deemed useful to discuss the details of such structures at this point. Utilizing a structure of this sort, the aforementioned objectives are achieved by separately and cooperatively varying the orientation of the antenna structure as a whole and the inherent characteristics of its radiation and reception patterns so that, while the receptional directionality of the antenna is varied rapidly to permit rapid coverage of a target area, the antenna remains capable of receiving effectively reflections arriving from each direction in which it is successively oriented for a time sufficient to permit it efficiently to receive reflections from distant, as well as from nearby targets. It would serve no useful purpose, at this point, to discuss the method by which this mode of operation is achieved; accordingly the detailed discussion of the method will be deferred to a later point in the specification.

The invention will be fully understood from a consideration of the following discussion of its principles and method, and description of various representative embodiments, in the course of which reference will be made to the drawings, in which:

Figs. 4–6, 6A, 9 and 10 are diagrams illustrating different embodiments of the invention.

Figure 1:
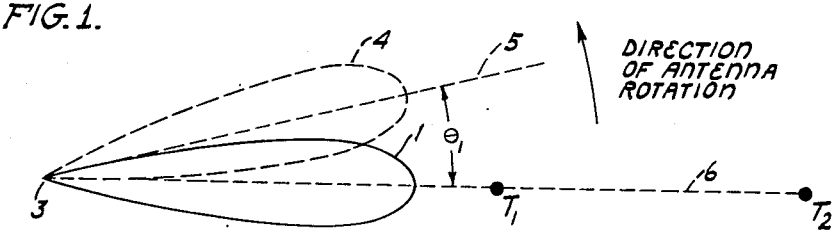
Figs. 1 and 2 are diagrams to which reference will be made in explaining the defects of prior art systems and methods and the reasons therefor, which are overcome by the present invention.
Figure 2:
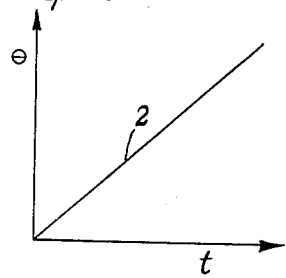

Before proceeding with the detailed discussion of the invention and the various embodiments thereof, it will be helpful to consider first, in further detail, the defects of the systems of the prior art and the reasons for their existence. As hereinbefore mentioned, the conventional search-type radar system employs a directional transmitting and receiving antenna which is normally mounted for rotation about a vertical axis to radiate electromagnetic wave energy in various azimuthal directions and to receive reflections of the energy thus radiated from target objects which are variously disposed azimuthally. Such an antenna may have a pattern of sensitivity as a function of azimuth angle, which, for a particular orientation of the antenna ($\theta$=azimuth angle=0), is as represented by the solid line 1 in Fig. 1. If, as is customary, the antenna is rotated at a constant angular speed, so that $\theta$ varies linearly with time as represented by the line 2 of the graph of Fig. 2, the antenna sensitivity pattern will revolve about point 3 (Fig. 1) at a uniform rate. At some later time the antenna will have rotated through an angle $\theta_1$ and its sensitivity pattern will have shifted to a new position, as represented by the broken line 4. The antenna will then be capable of receiving, with maximum efficiency, signals arriving in the direction of the axis 5 of its sensitivity pattern 4, and will be capable of receiving, with less efficiency, signals arriving from directions within a limited angle on either side of the axis 5, but it will be incapable of receiving signals arriving along the axis 6 of the pattern 1 of the antenna in its original position. Thus if the time required for energy radiated by the antenna, in its initial position, to traverse the distance from the antenna to a relatively nearby target $T_1$ and to return to the antenna after reflection, is sufficiently less than that required for the antenna to rotate through the angle $\theta_1$, the reflected signal will arrive while the antenna is still capable of receiving it. On the other hand, for a target $T_2$, whose distance from the antenna is such that the time required for energy to travel from the antenna to the target and return is equal to or greater than that required for the antenna to rotate through the angle $\theta_1$, the reflected signal will arrive when the antenna is no longer oriented so as to receive it.

Thus it will be seen that, in a conventional radar system employing a common, directional, variably orientable antenna for both transmission and reception, the maximum range from which an echo is receivable is directly dependent upon the speed of rotation of the antenna, and that the speed of rotation cannot be increased without limiting the maximum range of the system. This constitutes a distinct disadvantage in many types of radar systems, and particularly in those used for moving target indication (MTI), where it is particularly important to have a large number of looks at each target per unit time, and where the rapid rotation of the antenna will produce variations in the received signals which will make it more difficult to recognize changes in such signals owing to target motion. Hence the need is obvious for some means for overcoming this limitation, such as is provided by the present invention.

Figure 3:
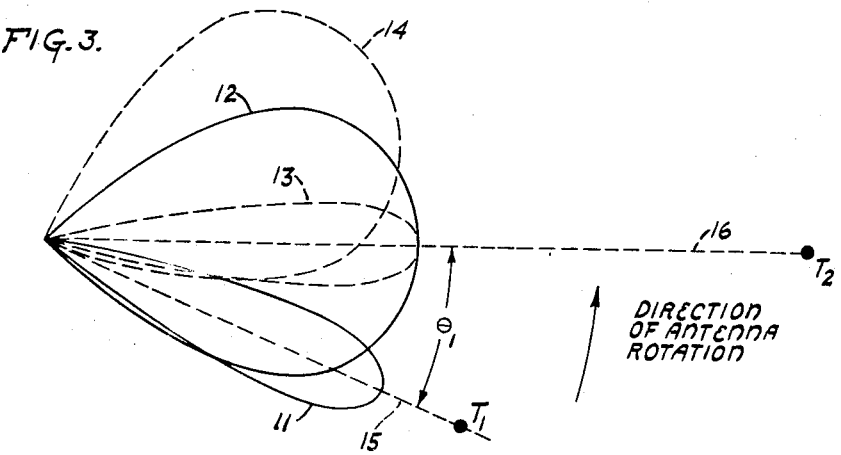
Figs. 3, 7 and 8 are diagrams to which reference will be made in explaining alternate modes of operation in accordance with the present invention.

Referring now to Fig. 3, solid lines 11 and 12 represent two patterns of antenna sensitivity versus azimuth angle. It will be noted that these patterns differ, one from the other, in orientation and in azimuthal width. Pattern 11 is substantially narrower than pattern 12 and is oriented so as to overlap the lower portion of the latter pattern, as indicated in the diagram. In accordance with one method of practicing the invention, there is provided an antenna structure capable of selectively providing patterns of either of the two forms generally represented in Fig. 3, and interrelated in the manner there represented. The antenna structure is constructed so as to be capable of rotation as a unit to change the orientations of both patterns while maintaining the prescribed orientational relationship between the separate patterns as illustrated in Fig. 3. In accordance with the method of the invention, the broader of the two patterns, 12, is preferably used for transmission only, while the narrower pattern, 11, is used solely for reception. The whole antenna structure may be rotated at a uniform speed so that its azimuth angle of orientation $\theta$ varies as represented by the solid line 2 of Fig. 2, as for a conventional antenna. Thus, after rotation through an angle $\theta_1$, the separate patterns will be oriented as represented by the broken lines 13 and 14 respectively. If, now, when the antenna is in its initial position (patterns 11 and 12), energy is radiated according to the pattern 12, targets within a relatively wide angle (compared to the width of pattern 11) will be irradiated. More specifically targets disposed on line 15, corresponding to the axis of narrow pattern 11 in its initial position, as well as targets disposed on line 16, which corresponds to the axis of the narrower pattern after it has assumed the position 13 following rotation of the antenna through the angle $\theta_1$, will be irradiated. Now it will be noted that reflections of the transmitted energy from a nearby target $T_1$, lying on line 15, will arrive at the antenna before it has had the opportunity to rotate through an angle of appreciable magnitude, and while the narrow receiving pattern is still in substantially the same position 11, which it originally occupied. Hence such reflections will be received rather efficiently. On the other hand, reflections from a distant target $T_2$, lying on line 16, will arrive at the antenna after it has had an opportunity to rotate through an angle of appreciable magnitude— e. g. when the orientation of the receiving pattern is as represented by the broken line 13. Therefore such reflections also will be received efficiently. Similarly reflections from targets at intermediate ranges, and lying azimuthally intermediate lines 15 and 16, will arrive at the antenna when it has rotated so that the receiving pattern lies azimuthally intermediate positions 11 and 13, and they too will be received satisfactorily. The same sort of behavior will, of course, obtain with respect to each successive pulse transmitted as the antenna rotates in azimuth.

It will be seen, therefore, that, by the provision of separate antenna patterns differing in width and directionality in the manner clearly illustrated in Fig. 3, which are rotated in unison so as to maintain the directional interrelationship between them fixed, and which are used respectively for transmission and reception, it is possible to overcome the limitations in respect of the speed of rotation of the antenna, for example in an otherwise conventional radar system, and to provide such a system in which the antenna can be rotated at a high rate of speed with the attendant advantages hereinbefore mentioned and without unduly limiting the maximum effective range of the system. An antenna structure having these features and characteristics can be constructed in a number of different ways, two typical examples of which will now be discussed.

Referring to Fig. 4, there is shown an antenna structure comprising a reflector 21 mounted by means of supports 22 and 23 on an upright member 24, the lower end of which is joined to a turntable 25 which is preferably circular in the plane perpendicular to the plane of the section. Forming an integral part of the turntable, or rigidly affixed thereto, is a downwardly extending portion 26, which is preferably of circular cross-section and whose lower end is seated in a depression in a base block 27 in such a manner as to permit rotation of turntable 25 about a central vertical axis. The outer rim of the turntable may be provided with gear teeth, as shown, which mesh with the teeth of a gear 28 affixed to the shaft 29 of a motor 30, which is thereby adapted to effect rotation of the turntable at a uniform angular speed. Passing vertically and centrally through the turntable 25 and its downwardly extending portion 26 are a pair of electromagnetic waveguides 31 and 32. These extend above the turntable and are terminated respectively in a pair of horns 33 and 34 which are directed at the reflector 21. The waveguides 31 and 32 are fixed with respect to the turntable so that, when the latter is rotated, the horns 33 and 34 will remain pointed at the same portion of the reflector 21.

The lower ends of waveguides 31 and 32 are connected through a rotating joint 35 of suitable form to a pair of corresponding waveguides 36 and 37 respectively in base block 27.

The rotating joint may comprise a pair of concentric circular grooves 38 and 39 in the upper surface of the base block 27. The end of waveguide 36 is bent, in the manner more clearly shown in the fragmentary sectional view of Fig. 4a, so as to run parallel to groove 39 for a short distance, and communication between the waveguide and the groove is established through an opening of the sort shown at 36a. The end of waveguide 37 is similarly bent so as to run parallel to the groove 38 for a short distance and communication between this waveguide and the groove 38 is established through an opening (not shown) similar to opening 36a. It will be noted, incidentally, that the section of Fig. 4a is taken along a cylindrical surface whose axis coincides with the axis of rotation of the turntable 25. By employing this mode of coupling between the waveguides and the grooves, and by using openings of appropriate size, in accordance with known practice, it is possible to insure that, for example, energy supplied through waveguide 36 from transmitter 40 will cause waves to be propagated in but one direction in groove 39. The lower ends of waveguides 31 and 32 are directed away from the axis of rotation of turntable 25 and are likewise bent so as to run parallel to grooves 39 and 38 respectively for short distances as shown in Fig. 4a. Communication between these guides and their respective grooves is likewise established through openings of the sort shown at 31a in Fig. 4a and at 31a and 32a in Fig. 4b, and for the same purpose as above mentioned. Also, the peripheral length of each groove may be made equal to an integral number of wavelengths of the energy employed, whereby destructive interference of the waves propagated in the grooves may be prevented.

The other ends of waveguides 36 and 37 respectively are connected to transmitter 40 and receiver 41, which may be constructed and operate in accordance with conventional radar practice. For example transmitter 40 may be operative only intermittently to generate time spaced pulses of microwave energy, and receiver 41 may be rendered operative only during the intervals between transmitter pulses to receive reflections thereof from target objects. A connection 42 may be provided between transmitter 40 and receiver 41 for rendering the latter ineffectual to receive signals during intervals when the former is operative.

During the occurrence of each transmitter pulse, energy from the transmitter 40 is supplied through waveguides 36 and 31 to horn 33, which directs it against reflector 21. The latter is suitably shaped, in accordance with known practice, to form the energy into a beam of appropriate width as determined by the characteristics of horn 33. As the entire antenna structure rotates about the vertical axis through the center of the turntable, this beam will be caused to radiate energy in different azimuthal directions and targets in various sectors will be irradiated successively. Similarly reflections of transmitted energy from targets in various sectors will be successively intercepted by reflector 21 as the antenna rotates and will be focussed upon the mouths of horns 33 and 34. The energy entering horn 34 is transmitted through waveguides 32 and 37 to receiver 41 where it may be used to operate a suitable indicator in accordance with conventional radar practice.

As will be seen from Fig. 5, which is a fragmentary auxiliary view taken perpendicular to the line 5—5' in Fig. 4, horns 33 and 34 may be differently shaped so as to provide different characteristics for transmission and reception. More particularly the shapes of the horns may be made such as to provide a broad pattern for transmission, such as that represented by the solid line 12 in Fig. 3, and a narrow pattern for reception, as represented by the solid line 11 in the same figure. Also the horns may be designed to provide the desired difference in directionality of the two patterns according to Fig. 3.

Thus, by the apparatus of Fig. 4 there is provided an embodiment of the invention in accordance with the principles hereinbefore discussed with reference to Fig. 3. For the reasons already fully set forth, the antenna structure thus provided is capable of being rotated at higher speed than the antennas of systems according to the prior art, to obtain a large number of "looks" at targets per unit time without reducing the maximum range of the system.

Figure 6:
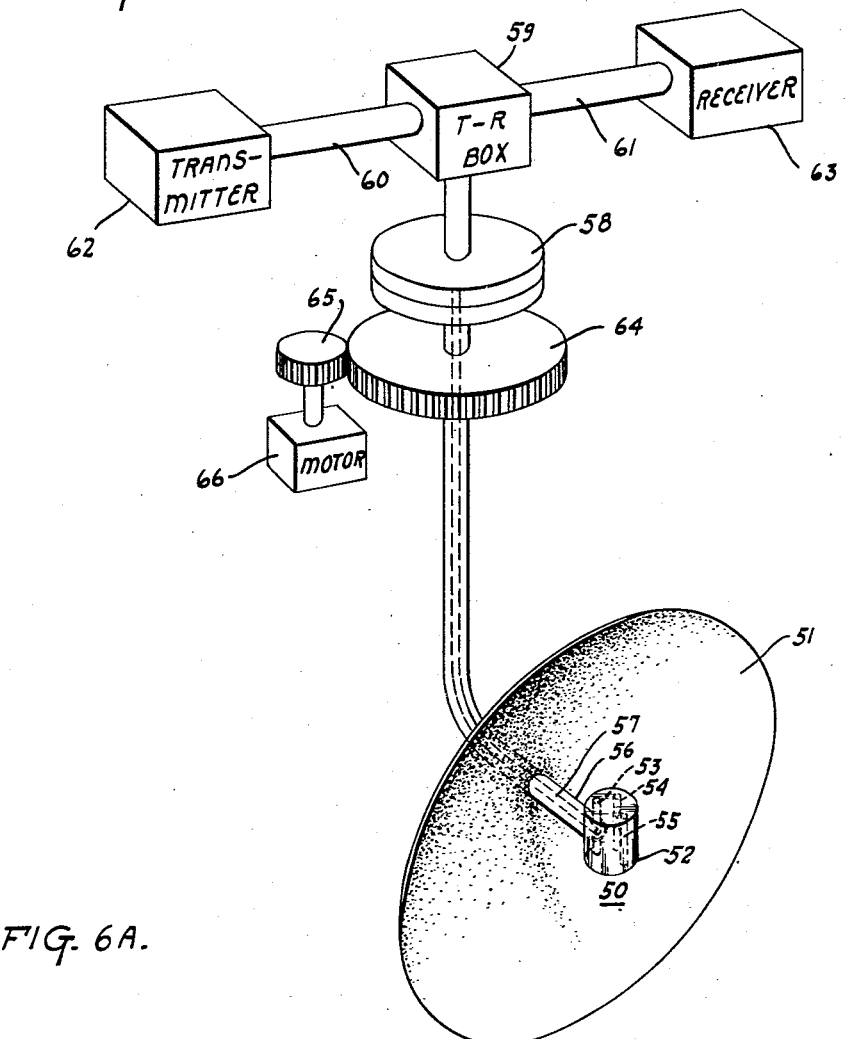
Figure 6A:
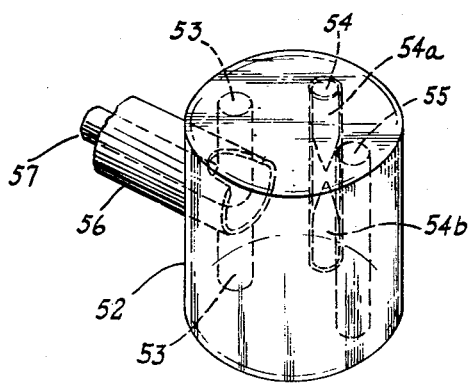

Alternative apparatus for producing the same results, together with the other essential elements of a complete radar system, are diagrammatically shown in Fig. 6. Here the antenna structure comprises a conventional paraboloidal reflector 51 in combination with a special form of radiator 50 which is shown in detail in Fig. 6A. The radiating structure is enclosed within a polystyrene or other suitable dielectric enclosure 52 and consists essentially of the elements 53, 54 and 55 arranged within and supported by the enclosure 52, which, in turn, is affixed to and supported by the coaxial transmission line 56 which passes through the central portion of the reflector 51. The conductors 56 and 57 of the coaxial line are terminated within the enclosure 52 in conventional dipole radiating elements 53 adapted to radiate microwave enrgy supplied to them through the line. Directly in front of, and spaced from the dipole elements 53, is a conductive auxiliary reflecting element 55 which functions conventionally to direct the energy radiated by the dipole toward reflector 51 which operates to form the energy into a beam. The operation of the antenna for transmission is further modified by the presence of the element 54. This element is displaced laterally with reference to elements 53 and 55 at a point somewhere between them and may comprise a tube of glass or other suitable dielectric material of approximately the same shape and size as the elements 53 and 55, and filled with a gas which is susceptible of being ionized in response to the impingent of high frequency electromagnetic wave energy thereon. To render the gas more readily susceptible of ionization in response to energy impingent thereon, there may be included within the tube a pair of pointed metallic electrodes 54a and 54b forming a spark gap. When the antenna is used for transmission, the energy radiated from dipole 53 impinges upon the gas within tube 54, causing it to ionize and act as an additional reflecting element to direct wave energy toward reflector 51 and to modify the effect of the latter in a manner which will be discussed further hereinafter. It is to be emphasized that the element 54 is operative only when the antenna structure is operating for purposes of transmission. When energy is no longer supplied through transmission line 56 to dipole 53, the gas within tube 54 will cease to be excited, will deionize, and the auxiliary reflecting element will no longer be effective to modify the characteristics of the antenna. When the antenna arrangement is operating solely for receiving purposes, the intensity of the received energy will, in general, be insufficient to ionize the gas within the element 54, so that the conductive element 55 will alone be effective in determining the characteristics of the antenna. It is to be understood that the speed of deionization of the gas within element 54, following a period of transmission, can conveniently be controlled by appropriate selection of the kind of gas used and by controlling its pressure in accordance with principles which are well known. In the present instance, a rapid deionization of the gas is desirable in order that a rapid shift from the transmitting to the receiving pattern may be effected. Accordingly the gas used may consist of a mixture of hydrogen and water vapor having a deionization time in the neighborhood of between one and five microseconds.

The antenna structure just described is shown in Fig. 6 forming part of a radar system. Accordingly the transmission line 56 may be connected through a conventional rotating joint 58 to a T-R box 59. Suitable connections 60 and 61 are provided from the latter to the transmitter and receiver of the system respectively, which are represented conventionally by labeled boxes 62 and 63. T-R box 59 functions in the usual manner to segregate the transmitted and received energy. Transmission line 56 may have affixed to it a gear 64 which meshes with a second gear 65 affixed to the shaft of a motor 66. By reason of the inclusion of the rotating joint 58 in the connection from transmission line 56 to T-R box 59, motor 66 is therefore operable to effect rotation of the antenna structure about a vertical axis for scanning purposes.

The characteristics of the antenna structure may be determined, in accordance with well-known practice, by appropriately selecting the shape and size of reflector 51 and the dimensions and positioning of elements 53 and 55, so that normally, and specifically for receiving purposes, the antenna has a sensitivity versus azimuth pattern as represented by the curve 11 in Fig. 3. Also the characteristics and positioning of the auxiliary directing element 54 may be chosen so that transmission of energy by the antenna will be in accordance with the pattern represented by the line 12 to Fig. 3.

Thus there is provided an alternate form of antenna capable of operating in the manner hereinabove discussed with reference to Fig. 3, and having the same advantages as regards its capability of being rotated at high speed without reduction in range of the system with which it is employed. It will be apparent that this alternate form poossesses certain advantages over the one initially described, particularly in respect of simplicity of structure, and it may therefore be preferable for use in certain applications.

Figure 7:
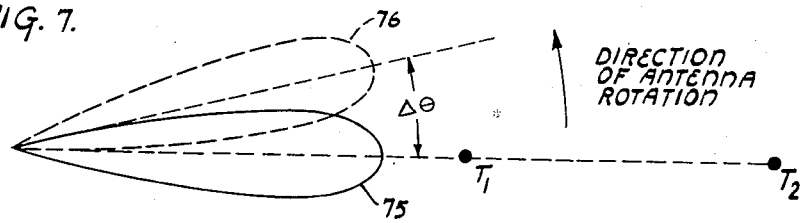

There will now be described, by reference to Figs. 7 and 8, an alternative method of operation in accordance with the principles of the invention. In Fig. 7 the solid line 75 represents a sensitivity versus azimuth pattern of relatively narrow azimuthal width, as would exist for a highly directional antenna of the sort conventionally used in scanning radar systems. In accordance with the present method of operation there is provided an antenna structure which permits intermittent rotation of such a pattern in accordance with the plot of azimuth angle versus time shown in Fig. 8. For this mode of operation, the antenna pattern, starting from the initial position designated by the solid line 75 in Fig. 7, will remain in that position for a time $\Delta t$ and will then jump through an azimuth angle $\Delta \theta$ to a new position as represented by the broken line 76. It will then remain in this new position for the same time $\Delta t$, following which it will again jump to a new position displaced in azimuth from the immediately preceding position by the same azimuth angle increment $\Delta \theta$. Thus the pattern will progress, changing its orientation by azimuthal increments of $\Delta \theta$ following each successive time interval $\Delta t$. Considering the effect of this mode of operation for nearby and distant targets, the intervals $\Delta t$, during which the pattern maintains a given orientation, may be made equal to the time required for electromagnetic wave energy to travel from the antenna to, and return from, a target at a predetermined maximum range. Then, not only will the antenna be capable of receiving effectively reflections from a nearby target $T_1$, but it will also be capable of receiving, with the same effectiveness, a reflection from a more distant target $T_2$, since its sensitivity versus azimuth pattern will be oriented in the same direction when the second reflection arrives as it was for the first. However, although the rotation of the antenna pattern is thus delayed for the interval of time $\Delta t$, this need not adversely affect the overall speed of rotation of the antenna, since, after each interval of duration $\Delta t$, the pattern is jumped through a substantial azimuthal angle. In fact it will be apparent that the durations of the intervals $\Delta t$ and the magnitudes of the azimuthal increments $\Delta \theta$ may be so chosen as to provide for a substantially higher average speed of rotation than would be possible in the case of an antenna rotated at uniform angular speed, without limiting the maximum range of the system of which it forms a part. Furthermore it will be seen that the shape of the pattern may be selected so that complete azimuthal coverage will be obtained despite the intermittent rotation thereof. To this end the width of the pattern should be made sufficient to provide adequate sensitivity over a sector of width equal to half the azimuthal increment $\Delta \theta$, but should not be made so large that it unduly reduces the directional resolution of the antenna.

Figure 8:
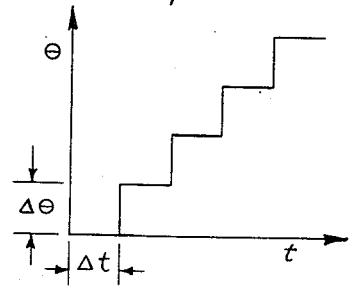

While it is possible that motion of the antenna pattern in accordance with the graph of Fig. 8 might be produced by purely mechanical means, substantial difficulties would be involved in doing so by reason of the significance of inertia effects owing to the high acceleration which would be required of some of the parts. Accordingly it is desirable to resort to other means which do not require such high accelerations. One example of such apparatus will now be described with reference to Fig. 9. There is shown an antenna structure which somewhat resembles that shown in Fig. 4, in that it comprises a reflector 81 mounted by means of supports 82 and 83 on an upright member 84, the lower end of which is joined to a turntable 85. As in the apparatus of Fig. 4, the turntable has a downwardly extending portion 86, the lower end of which is appropriately formed to seat in a circular depression in a base block 87 so as to permit rotation of the turntable about a central vertical axis. Also the outer rim of the turntable may be provided with teeth which mesh with the teeth of gear 88 affixed to shaft of motor 89, whereby the motor is adapted to effect rotation of turntable 85 at constant angular speed. In the present apparatus a single waveguide 90 passes vertically and centrally through the turntable 85 and is connected by a rotating joint 91 with a second waveguide 92 in baseblock 87. The latter communicates through T-R box 93 and via suitable connections 94 and 95 with transmitter 96 and receiver 97.

Waveguide section 90 extends above the upper surface of turntable 85 to a junction point 98, where it branches into two waveguide sections 99 and 100. The former connects directly to a radiating horn 101 and is provided with an anti-T-R device 102 connected to it at a point one-half wavelength from the junction point 98 for energy supplied by transmitter 96. The latter waveguide section 100, on the other hand, is connected through a T-R device 104 to a second horn radiator 103. Both horns 101 and 103 are directed at reflector 81, which cooperates, in one instance, to form transmitted energy emitted from horn 101 into a beam suitable for scanning purposes, and in the other instance to concentrate received, reflected energy and focus it on the mouth of horn 103. As in the embodiment of Fig. 4, the horns 101 and 103 of the present embodiment remain fixed in position relative to reflector 81 so that, as the antenna structure rotates, it will be caused to radiate energy in different azimuthal directions, and to receive reflections of such energy from target objects. Anti-T-R device 102 and T-R device 104 are devices similar to the devices bearing the same names which are generally used in conventional radar apparatus. Hence they need not be described in detail as to structure, but only as to function. T-R device 104 is responsive to transmitter energy to prevent such energy, entering waveguide section 100, from reaching horn 103. However, in the absence of such activation, it is operative to permit the passage of received energy from horn 103 through waveguide section 100 to waveguide 90. Similarly anti-T-R device 102 is normally operative to exclude received energy from waveguide section 99, but is operative in response to transmitted energy to permit the passage of such energy from junction point 98 to horn 101. Thus it will appear that whenever transmitter 96 is operative (e. g. during time-spaced intervals) energy will be transmitted through T-R device 93 and waveguide sections 92, 90 and 99 to horn 101 to be radiated; but when the transmitter is inoperative, and after T-R device 104 and A-T-R device 102 have had an opportunity to deionize, any received reflections arriving at the antenna will be intercepted by horn 103 and will be transmitted through T-R device 104, waveguide sections 100, 90 and 92 and T-R device 93 to receiver 97. As will be explained presently, however, the deionization times of devices 104 and 102 may be made substantially greater than that for T-R box 93, so that the effectiveness of horn 101 will be gradually reduced, and that of horn 103 will be gradually increased, during an interval of predetermined duration following the transmission of a pulse.

As indicated in Fig. 10, which is a fragmentary auxiliary view taken perpendicular to the line 10—10' in Fig. 9, the transmitting horn 101 and the receiving horn 103 may be of substantially the same size and shape, and each adapted to provide patterns of substantially the same width.

However, as indicated by arrows 105 and 106 they are oriented in slightly different directions so as to produce differently directed patterns, corresponding respectively, for example, to those represented by the lines 75 and 76 in Fig. 7. Thus, for a given azimuthal orientation of the antenna structure, the pattern resulting from the cooperation of the transmitting horn 101 with the reflector 81 may be as represented by the broken line 76 in Fig. 7; while the pattern resulting from cooperation of the receiving horn 103 with reflector 81 may be as represented by the solid line 75.

Assuming this orientation of the antenna structure to exist, then if a pulse of energy is supplied from transmitter 96, horn 101 and reflector 81 will cooperate to radiate it in accordance with pattern 76 of Fig. 7. Following such transmission anti-T-R device 102 and T-R device 104 will cooperate to convert the antenna from operation in accordance with the sensitivity pattern 76 to operation in accordance with pattern 75. However, this process of conversion will not occur instantaneously but will take place over a time interval whose duration is determined by the inherent speed of deionization of the tubes employed in the anti-T-R and T-R devices. As a result, during the time immediately following transmission, horn 101 will initially operate to receive energy in accordance with pattern 76, but will gradually become less effective to do so as the deionization of the A-T-R and T-R tubes progresses. On the other hand, horn 103 will initially be ineffectual to receive energy, but, as the deionization proceeds, will gradually be rendered increasingly effective to do so in accordance with the sensitivity pattern 75. Finally horn 101 will be rendered completely ineffectual for receiving purposes and horn 103 alone will be effectual as a receiver. Thus, assuming the antenna structure as a whole to have remained fixed in orientation during the entire time of deionization of the T-R and A-T-R tubes, there will nevertheless have been produced a shift in the effective orientation of the antenna from that represented by the pattern 76, at the commencement of the interval, to that represented by the pattern 75 at the termination thereof. Throughout the interval both horns 101 and 103 will cooperate and will contribute in varying degrees to the production of an over-all pattern which gradually shifts in orientation from that of pattern 76 to that of pattern 75. In order that this result may be achieved in the most satisfactory manner, the radiation from the two horns must be in proper phase at all times. This condition may be obtained by appropriately adjusting the lengths of waveguide sections 99 and 100 and/or the tuning of T-R device 104 and A-T-R device 102. Finally it will be observed that, when the transmitter 96 again supplies a pulse of energy, the T-R and A-T-R devices will immediately be ionized and will operate to render horn 101 solely effective, so that the antenna pattern will again shift back to the position 76, and the process above described will be repeated.

It is to be remembered that, in the immediately foregoing discussion, the orientation of the antenna structure as a whole has been assumed fixed. In practice this will not be the case. Rather the turntable 85, together with the horns 101 and 103 and the reflector 81, will be driven by motor 89 to rotate at constant speed in a counterclockwise direction (as viewed from above). By reason of such rotation the patterns 76 and 75 for the two horns 101 and 103 respectively will also move counterclockwise as viewed from above. In particular it is to be noted that such rotation will be in a direction opposite to that in which the effective orientation of the composite pattern produced by both horns 101 and 103 tends to rotate owing to deionization of the T-R and A-T-R devices 102 and 104 immediately following a period of transmission. Now it will be aparent that, for a given speed of rotation of the whole antenna structure, the rates of deionization of the T-R and A-T-R devices may be chosen such that the tendency of the resultant antenna pattern to rotate counterclockwise in response to the rotation of the entire antenna structure will be exactly compensated by the tendency for it to rotate clockwise owing to the gradual rendering of horn 101 less effective and horn 103 more effective. This is accomplished, as hereinbefore set forth, by appropriate selection of the gas employed in the T-R and A-T-R tubes and by adjustment of the pressures at which they operate. Thus it may be arranged that the resultant antenna pattern will remain essentially fixed in orientation during an interval following transmission of a pulse of energy, and the duration of such interval may be made equal to the time between successive pulse transmissions for the radar system. At the end of this interval, and in response to the supply of a pulse of energy from transmitter 96, the antenna will promptly become effective to radiate energy through the cooperation of horn 101 and such transmission will be in accordance with pattern 76. Thus, at this time, the effective antenna pattern will promptly undergo a shift through an angle $\Delta \theta$ as represented in Fig. 7. This procedure will be repeated for each successive transmitter pulse, and the result will be that the overall antenna pattern will rotate intermittently in discrete angular jumps as proposed in the discussion of Fig. 7. Thus, also, there will be provided an antenna structure operating in the manner described which is susceptible of rapid rotation without reduction in maximum range.

Although the invention has been described by reference to certain representative embodiments which are presently regarded as most practical and useful, it is not therefore to be regarded as limited to such embodiments. On the contrary it is contemplated that the invention may be embodied in various other physical forms such as will occur to those skilled in the art as being best suited for use in specific applications.

In particular it is appropriate to emphasize that, independently of the various arrangements expressly disclosed, the invention embraces certain broad methods of controlling the scanning and characteristics of an antenna pattern, particularly for purposes of object detection and location.

These methods, as covered by certain of the appended claims, are in no way dependent upon the apparatus expressly disclosed, but are susceptible of practice using entirely different forms of apparatus or by purely manual or mechanical manipulation. Thus it will be apparent, for example, that motion of an antenna pattern, as discussed with reference to Figs. 7 and 8, might be achieved merely by imparting the necessary mechanical forces to a conventional directional antenna structure. However, although this expedient is suited to certain applications, it may, as hereinbefore mentioned, prove unsatisfactory where the inertia of the structure is large and great accelerations are required.

I claim:

1. In an object locating system including antenna means and means cooperating with said antenna means to radiate time-spaced pulses of electromagnetic wave energy at a predetermined repetition rate and to receive reflections of said radiated pulses from target objects, said antenna having first and second elements, one of said elements imparting to said antenna a predetermined directional sensitivity pattern in a given azimuth plane which pattern is controllable in respect of its azimuthal orientation and in respect of its azimuthal width, means for controlling said antenna to cause said pattern to rotate azimuthally at a rate such that a plurality of pulses are transmitted during each revolution of said pattern, and means for actuating the other of said elements for further controlling said antenna to cause the azimuthal width of said pattern to alternate between relatively wide and narrow values at said pulse repetition rate, the intervals during which said pattern is relatively wide being made to coincide substantially with the transmission of said pulses.

2. Antenna apparatus according to claim 1 characterized in that said means operative to cause the azimuthal width of said pattern to alternate between relatively wide and narrow values is effective to cause the durations of intervals during which said azimuthal width is relatively narrow to be substantially longer than the intervals during which it is relatively wide.

3. Antenna apparatus comprising antenna structure having a predetermined directional sensitivity pattern in a given azimuth plane, said structure being rotatable as a unit to vary the orientation of said pattern, means to periodically apply to said antenna electrical wave energy to be radiated, and means operative in response to said electrical wave energy supplied to said structure for radiation for altering a predetermined characteristic of said pattern in said plane at least during radiation of such energy periodically during the rotation of said structure in synchronism with the radiation of said energy.

4. Antenna apparatus comprising antenna structure having a predetermined directional sensitivity pattern in a given azimuth plane, said structure being rotatable as a unit to vary the orientation of said pattern, means to periodically apply to said antenna electrical wave energy to be radiated, and means operative independently of rotation of said structure and in response to said electrical wave energy supplied to said structure for radiation for altering the orientation of said pattern in said plane with reference to said structure at least during radiation of such energy periodically during the rotation of said structure in synchronism with the radiation of said energy.

5. Antenna apparatus comprising antenna structure having a predetermined directional sensitivity pattern in a given azimuth plane, said structure being rotatable as a unit to vary the orientation of said pattern, means to periodically apply to said antenna electrical wave energy to be radiated, and means operative in response to said electrical wave energy supplied to said structure for radiation for altering the width of said pattern in said azimuth plane at least during radiation of such energy periodically during the rotation of said structure in synchronism with the radiation of said energy.

6. Antenna apparatus comprising antenna structure adapted to transmit and receive electromagnetic wave energy, said structure having a predetermined directional sensitivity pattern in a given azimuth plane and being rotatable as a unit to vary the orientation of said pattern, means to periodically apply to said antenna structure electromagnetic wave energy to be radiated, and means disposed so as to intercept a portion of said electromagnetic wave energy radiated from said structure and responsive to said wave energy to alter a predetermined characteristic of said pattern in said plane at least during radiation of said energy periodically during the rotation of said structure in synchronism with the radiation of said energy.

7. In combination, antenna structure adapted to transmit and receive electromagnetic wave energy, said structure having a predetermined directional sensitivity versus azimuth pattern and being rotatable as a unit to vary the orientation of said pattern, means disposed in the path of electromagnetic wave energy radiated from said structure and responsive to said wave energy impingent thereon to alter a predetermined characteristic of said pattern at least during radiation of said energy, said last-named means comprising a container made of dielectric material and filled with an ionizable medium which is capable of being ionized in response to electromagnetic wave energy of at least a predetermined intensity impingent thereon, means for intermittently supplying electromagnetic wave energy to said structure to be radiated, the intensity of said energy being sufficiently great to ionize said medium.

8. Antenna apparatus comprising an electromagnetic wave energy reflector, a dipole antenna element and an auxiliary reflector, said auxiliary reflector comprising a conductive rod disposed substantially parallel to said dipole on the side thereof remote from said first-named reflector, and said reflectors and said dipole cooperating to provide a predetermined directional sensitivity versus azimuth pattern, and an additional element disposed in the path of electromagnetic wave energy radiated from said apparatus, said element comprising an elongated container made of dielectric material and filled with an ionizable medium which is capable of being ionized in response to electromagnetic wave energy of at least a predetermined intensity impingent thereon to cause said element to operate as an additional wave reflector, said element lying in a plane which perpendicularly intersects a plane passing through said dipole and said auxiliary reflector along a line interjacent said dipole and said auxiliary reflector, and said element being displaced from said intersection and being disposed substantially parallel to said dipole and said auxiliary reflector.

9. Antenna apparatus comprising antenna structure having a predetermined directional sensitivity pattern in a given azimuth plane, other antenna structure having a predetermined directional sensitivity pattern in said azimuth plane, said two patterns differing in respect of at least a predetermined characteristic, means for rotating both of said structures simultaneously at the same angular speed to vary the orientations of both of said patterns while maintaining the orientational relationship between them substantially fixed, means to supply to one of said structures electromagnetic wave energy to be radiated, and means responsive to said electromagnetic wave energy to render one of said structures relatively less effectual than the other of said structures to receive electromagnetic wave energy and to render said one structure relatively more effectual than said other structure to radiate said supplied energy.

10. Antenna apparatus according to claim 9 in which said antenna structures are constructed and arranged to provide sensitivity patterns in said azimuth plane which are oriented in different directions.

11. Antenna apparatus according to claim 10 in which said antenna structures are constructed to provide sensitivity patterns in said azimuth plane which are each of substantially the same azimuthal width.

12. Antenna apparatus comprising antenna structure having a predetermined directional sensitivity pattern in a given azimuth plane, other antenna structure having a predetermined directional sensitivity pattern in said plane, said two patterns differing in respect of at least a predetermined characteristic and said structures being rotatable simultaneously to vary the orientations of both of said patterns while maintaining the orientational relationship between them substantially fixed, a common energy transmission channel for the transmission of electromagnetic wave energy to and from both of said structures, means to supply to said channel electromagnetic wave energy to be radiated separate energy transmission channels connecting said structures respectively to said common channel, means included in one of said separate channels and responsive to said electromagnetic wave energy of at least a predetermined minimum intensity impressed on said channel to inhibit substantially the flow of energy through said channel, and means included in the other of said separate channels and responsive to said electromagnetic wave energy of at least a predetermined minimum intensity impressed on said channel to permit substantial flow of energy through said channel.

13. Antenna apparatus according to claim 9 in which said means for normally rendering one of said antenna structures relatively less effectual than the other of said structures to receive electromagnetic wave energy, and which is operable in response to electromagnetic wave energy at least a predetermined minimum intensity supplied to said apparatus for transmission to render said one structure relatively more effectual than said other structure to radiate said supplied energy, includes an ionizable medium arranged to control the effectiveness of said antenna structures in accordance with the degree of ionization of said medium, said medium being arranged to be ionized in response to electromagnetic wave energy of at least a predetermined minimum intensity supplied to said apparatus for transmission and said medium being characterized in that a substantial time is required for it to deionize following a particular ionization, whereby the effect of said medium, following a particular ionization thereof, is to cause a gradual diminution in the effectiveness of said one structure and a gradual increase in the effectiveness of said other structure during the period of deionization of said medium.

14. In an object locating system of the reflection type, common antenna means for radiating high frequency energy and for receiving reflections of high frequency energy radiated by said means and subsequently reflected from target objects, said antenna means having a directional sensitivity pattern in a given azimuth plane and being controllable to vary the azimuthal orientation of said pattern in said plane, and means for controlling said antenna means to maintain the azimuthal orientation of said pattern substantially constant in said azimuth plane throughout each of a plurality of cyclically recurring successive time intervals of predetermined substantially equal durations and to alter the azimuthal orientation of said pattern in said plane by predetermined substantially equal amounts between said successive intervals.

15. An object locating system according to claim 14 in which said means for controlling said antenna means is operative to alter the azimuthal orientation of said pattern between successive intervals by predetermined amounts which are substantially equal to the effective azimuthal width of said pattern in said plane.

16. In an object locating system of the reflection type, common antenna means for radiating high frequency energy and for receiving high frequency energy radiated by said means and subsequently reflected from target objects, said antenna means having a directional sensitivity pattern in a given azimuth plane and being controllable to vary the azimuthal orientation of said pattern in said plane, means for controlling said antenna means to maintain the azimuthal orientation of said pattern in said plane substantially constant throughout each of a plurality of cyclically recurring successive time intervals of predetermined substantially equal durations and to alter the azimuthal orientation of said pattern in said plane by predetermined substantially equal amounts between successive intervals, and means for supplying said antenna means with high frequency energy to be radiated during only a fraction of each of said intervals immediately following the inceptions of said intervals.

17. In an object locating system of the reflection type, antenna structure mounted for rotation about an axis, said structure comprising separate directional antenna means, each having a predetermined sensitivity pattern in a given azimuth plane and the azimuthal orientations of said patterns in said plane differing by a predetermined amount, means for rotating said structure at a substantially uniform angular speed to vary simultaneously the azimuthal orientations of said patterns of said separate means in said plane while maintaining substantially constant the difference in their azimuthal orientations and to cause the pattern of the first of said antenna means to lead the pattern of the second of said antenna means, means for supplying periodically recurrent time-spaced pulses of high frequency energy to said first antenna means for transmission, receiving means coupled to both of said antenna means during at least a portion of each interval between said pulses, means for gradually decreasing the coupling between said receiving means and said first antenna means and for gradually increasing the coupling between said receiving means and said second antenna means during each of said last-named intervals.

18. In an object locating system of the reflection type, a common antenna structure for radiating high frequency energy and for receiving high frequency energy radiated by said structure and subsequently reflected from target objects, said antenna structure having a directional sensitivity pattern in a given azimuth plane, being continuously rotatable as a unit about a given axis to vary the orientation of said pattern, and being further controllable independently of said rotation to vary the orientation of said pattern in said plane about said axis with reference to said structure, means for rotating said structure at a substantially uniform rate to vary the azimuthal orientation of said pattern in said plane, and means for controlling said antenna structure to vary the orientation of said pattern with reference to said structure in different senses alternately at a rate such that a plurality of said alternations occur during each complete revolution of said antenna structure, said last-named means being operative to vary the orientation of said pattern in said plane substantially more rapidly in the sense corresponding to that of the rotation of said structure than in the sense opposite to that of the rotation of said structure.

19. In an object locating system of the reflection type, a common antenna structure for radiating high frequency energy and for receiving high frequency energy radiated by said structure and subsequently reflected from target objects, said antenna structure having a directional sensitivity pattern in a given azimuth plane, being continuously rotatable as a unit about a given axis to vary the orientation of said pattern, and being further controllable independently of said rotation to vary the orientation of said pattern in said plane about said axis with reference to said structure, means for rotating said structure at a substantially uniform rate to vary the orientation of said pattern in said plane, and means for controlling said antenna structure to vary the orientation of said pattern in said plane with reference to said structure in different senses alternately at a rate such that a plurality of said alternations occur during each complete rotation of said antenna structure, said last-named means being operative to vary the azimuthal orientation of said pattern in said plane in the sense opposite to that of the rotation of said structure at an angular speed which is substantially equal in magnitude to the angular speed of rotation of said structure and to vary the orientation of said pattern in said plane in the sense corresponding to that of the rotation of said structure at a substantially higher speed.

20. An object locating system of the reflection type comprising an antenna structure for radiating high frequency energy and for receiving high frequency energy radiated by said structure and subsequently reflected from target objects, said antenna structure having a directional sensitivity pattern in a given azimuth plane and being controllable to vary the azimuthal orientation of said pattern in said plane, means for rotating said structure at a given angular velocity about a given axis to vary the azimuthal orientation of said pattern in said plane at a given average rate, means to apply to said antenna structure electromagnetic wave energy to be radiated, and means for cyclically varying the orientation of said pattern in said plane in different senses alternately at a rate such that a plurality of said alternations occur during each complete revolution of said antenna structure, said last-named means being operative to vary the orientation of said pattern in said plane relative to the orientation of said antenna structure by fixed amounts each defined by a first limiting azimuth value established by the azimuth value of said pattern during the radiation of said high frequency energy and a second limiting azimuth value established by the azimuth value of said pattern required to receive reflected high frequency energy from a target object spaced a predetermined distance from said antenna structure.

21. An object locating system of the reflection type comprising an antenna structure for radiating high frequency energy and for receiving high frequency energy radiated by said structure and subsequently reflected from target objects, said antenna structure having a directional sensitivity pattern in a given azimuth plane and being controllable to vary the azimuthal orientation of said pattern in said plane, means for rotating said structure at a given angular velocity about a given axis to vary the azimuthal orientation of said pattern in said plane at a given average rate, means to apply to said antenna structure electromagnetic wave energy to be radiated, and means for cyclically varying the orientation of said pattern in said plane relative to the orientation of said antenna structure in different senses alternately at a rate such that a plurality of said alternations occur during each complete revolution of said antenna structure, said last-named means for cyclically varying the orientation of said pattern in said plane in different senses being responsive to the said electromagnetic wave energy to be radiated.

References Cited in the file of this patent

UNITED STATES PATENTS

| Number | Name | Date |
| --- | --- | --- |
| 2,064,582 | Wolff | Dec. 15, 1936 |
| 2,082,042 | Wolff | June 1, 1937 |
| 2,083,242 | Runge | June 8, 1937 |
| 2,142,648 | Linder | Jan. 3, 1939 |
| 2,173,234 | Linder | Sept. 19, 1939 |
| 2,405,930 | Goldberg | Aug. 13, 1946 |
| 2,406,396 | O'Brien | Aug. 27, 1946 |
| 2,407,250 | Busignies | Sept. 10, 1946 |
| 2,408,373 | Chu | Oct. 1, 1946 |
| 2,408,425 | Jenks | Oct. 1, 1946 |
| 2,409,448 | Rost | Oct. 15, 1946 |
| 2,415,095 | Varian | Feb. 4, 1947 |
| 2,422,334 | Bedford | June 17, 1947 |
| 2,424,984 | Hoffman | Aug. 5, 1947 |
| 2,426,183 | Deloraine | Aug. 26, 1947 |
| 2,426,217 | Hoisington | Aug. 26, 1947 |
| 2,446,024 | Porter | July 27, 1948 |
| 2,452,349 | Becker | Oct. 26, 1948 |
| 2,458,175 | Kolding | Jan. 4, 1949 |
| 2,464,274 | Todd | Mar. 15, 1949 |
| 2,468,032 | Busignies | Apr. 26, 1949 |
| 2,480,829 | Barrow | Sept. 6, 1949 |
| 2,508,384 | Gross | May 23, 1950 |
| 2,509,207 | Busignies | May 30, 1950 |
| 2,514,617 | Albersheim | July 11, 1950 |
| 2,518,564 | Nebel | Aug. 15, 1950 |

FOREIGN PATENTS

| Number | Country | Date |
| --- | --- | --- |
| 694,523 | Germany | July 4, 1940 |
| 868,490 | France | Dec. 31, 1941 |